No. 717,924. PATENTED JAN. 6, 1903.
A. H. REID.
SHAFT BEARING.
APPLICATION FILED DEC. 10, 1901. RENEWED NOV. 28, 1902.
NO MODEL.
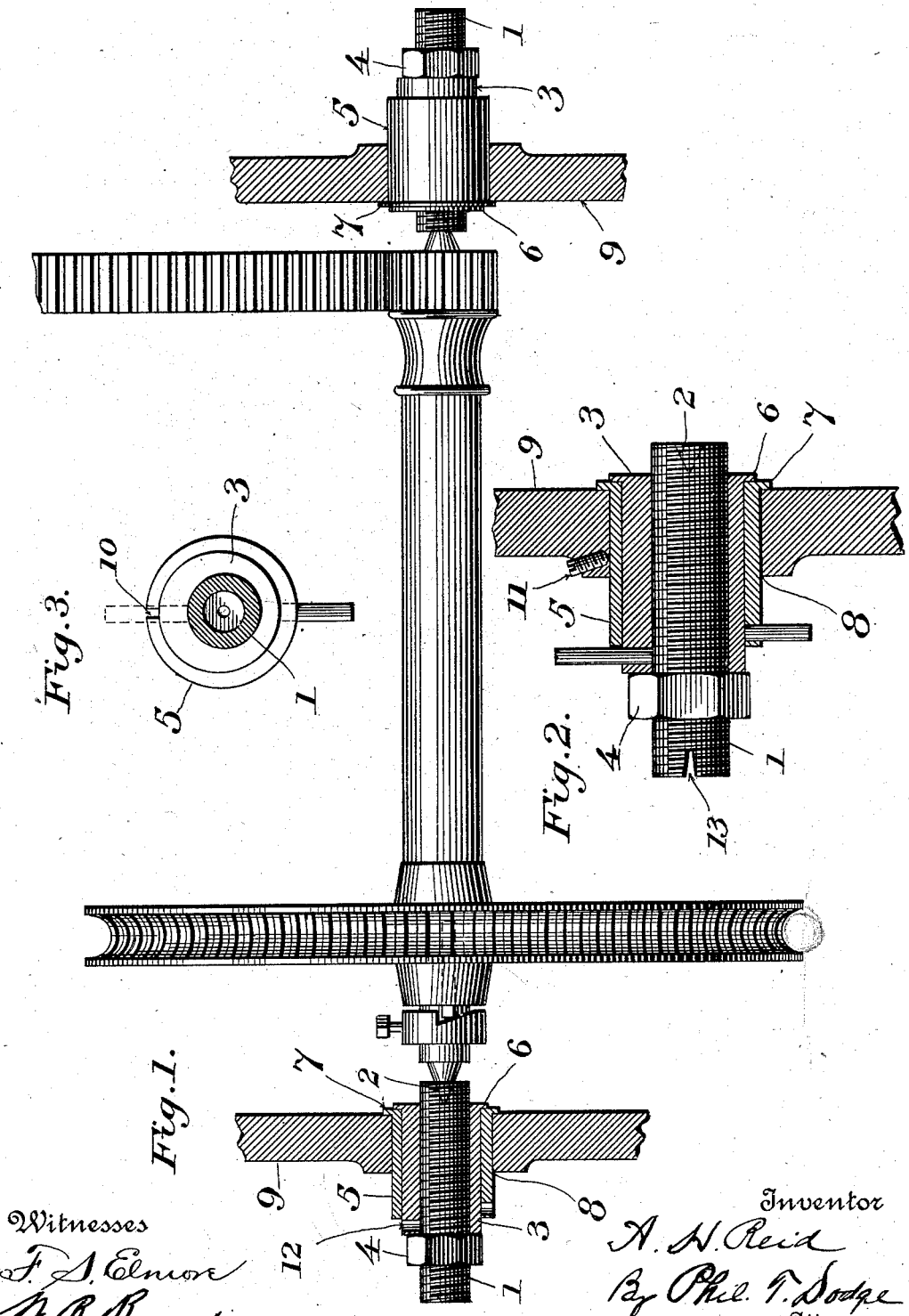
Witnesses
F. A. Elmore
N. R. Kennet
Inventor
A. H. Reid
By Phil. T. Dodge
Attorney

UNITED STATES PATENT OFFICE.

ALBAN H. REID, OF PHILADELPHIA, PENNSYLVANIA.

SHAFT-BEARING.

SPECIFICATION forming part of Letters Patent No. 717,924, dated January 6, 1903.

Application filed December 10, 1901. Renewed November 28, 1902. Serial No. 133,092. (No model.)

*To all whom it may concern:*

Be it known that I, ALBAN H. REID, of Philadelphia, county of Philadelphia, and State of Pennsylvania, have invented a new and useful Improvement in Shaft-Bearings, of which the following is a specification.

This invention has reference to a shaft-bearing; and it consists of a bearing embodying an improved arrangement of eccentric sleeves by the relative rotation of which the shaft may be adjusted to a nicety in various directions.

The invention is designed particularly for use in connection with centrifugal separators to give support to and admit of a fine adjustment of the shaft which carries the worm-wheel, which latter engages the worm on the stem of the rotary bowl; but it is obvious that the invention may be used in other mechanisms where a fine and universal adjustment is desired.

In the accompanying drawings, Figure 1 is a sectional elevation of my improved bearings applied in connection with the worm-wheel shaft of a centrifugal separator. Fig. 2 is a longitudinal section through one of the bearings on an enlarged scale. Fig. 3 is a cross-section through the same.

Referring to the drawings, my improved bearings are designed to be used in pairs to support the opposite ends of the shaft, and each consists of a central core 1, having at its inner end a conical bearing-socket 2 to receive the pointed end of the shaft. This core is threaded exteriorly and has screwed on it an eccentric sleeve 3, to which the core may be firmly fastened by a jam-nut 4, screwed onto the core and adapted to bear against the outer end of the sleeve. Loosely encircling this sleeve is a second eccentric sleeve 5, having its front end seated behind an annular flange 6 on the front end of the sleeve 3 and provided with an annular shoulder 7, which projects over the edge of a cylindrical opening 8, formed in the frame 9 of the machine, in which cylindrical hole the outer sleeve is loosely but snugly fitted. The outer sleeve is split, as shown at 10, Fig. 3, so that it may be tightened on the inner sleeve and hold the parts fixedly in position. This is accomplished by a binding-screw 11, tapped in the frame and bearing against the sleeve.

The outer end of the sleeve 5 terminates a short distance from the end of the inclosed sleeve, so that a portion of the latter is exposed, and a hole 12 is formed in this exposed portion to receive a pin or other suitable device by which the sleeve may be turned. The end of the outer sleeve is provided with a similar hole for the same purpose.

From the foregoing description it will be seen that by turning the eccentric sleeves the core carrying the shaft may be shifted in all directions transversely of its axis and may be locked and held in the position adjusted by the binding-screw 11. The construction, therefore, affords a convenient and effective means for adjusting the shaft to a nicety in all directions. The device is of peculiar advantage in connection with the worm-wheel shaft of centrifugal separators, where there is frequent demand for a nice adjustment of the shaft in various directions to adjust the position of the worm-wheel with reference to the worm.

The central core is slotted in its outer end, as at 13, to receive a tool by which it may be turned to adjust the shaft endwise, and it is formed with a longitudinal hole through which lubricant may be supplied to the end of the shaft.

Having thus described my invention, what I claim is—

1. The combination with a frame, of an adjustable eccentric sleeve mounted therein, a second sleeve mounted in the first, a core situated within the second sleeve and adapted to afford a bearing for the shaft, a locking device for holding the core and second sleeve in fixed relations, and means for locking the eccentric sleeve to the frame and to the second sleeve, substantially as described.

2. In combination with a frame, an eccentric sleeve mounted therein, a core screwed into the same and adapted to serve as a shaft-bearing, and a jam-nut on the core adapted to bear on the eccentric sleeve.

3. In combination with the frame, a split eccentric sleeve rotatable therein, a shaft-bearing carried by the eccentric sleeve, and a binding-screw sustained by the frame and engaging the split sleeve and serving to bind the same to the frame and bearing.

4. In combination with the frame, a split eccentric sleeve mounted therein, a second eccentric sleeve mounted in the first, a core screwed into the second sleeve and serving as a shaft-bearing, a jam-nut on the core engaging the end of the second sleeve, and a screw in the frame engaging the first sleeve.

5. In combination with the frame provided with a cylindrical opening, an eccentric sleeve mounted therein and formed with an annular flange extending radially outward around the opening, a second eccentric sleeve mounted in the first and provided with an annular flange extending outward over the end of the first sleeve, and a shaft-bearing mounted in the second sleeve.

6. The combination with the frame, of an eccentric sleeve mounted therein with its end exposed, a second sleeve mounted in the first with its end exposed beyond that of the first, said exposed ends of the sleeves being formed to be manually adjusted, and a shaft-bearing carried by the second sleeve.

7. In combination with the frame, a rotatable eccentric sleeve mounted therein, a second rotatable eccentric sleeve mounted in the first, a shaft-bearing mounted in the second sleeve and adjustable longitudinally therein, means for locking the shaft-bearing to the sleeve, and means for locking the two sleeves together and to the frame.

In testimony whereof I hereunto set my hand, this 21st day of November, 1901, in the presence of two attesting witnesses.

ALBAN H. REID.

Witnesses:
R. S. REED,
MAY R. BRINDBERT.